US012345825B2

(12) United States Patent
Koohi et al.

(10) Patent No.: US 12,345,825 B2
(45) Date of Patent: Jul. 1, 2025

(54) SYSTEMS AND METHODS UTILIZING MOBILE DELIVERY DEVICES IN ITEM DELIVERY

(71) Applicant: United States Postal Service, Washington, DC (US)

(72) Inventors: Anoosha Koohi, Mclean, VA (US); Charles P. McLellan, Fairfax, VA (US)

(73) Assignee: United States Postal Service, Washington, DC (US)

( * ) Notice: Subject to any disclaimer, the term of this patent is extended or adjusted under 35 U.S.C. 154(b) by 306 days.

(21) Appl. No.: 18/186,104

(22) Filed: Mar. 17, 2023

(65) Prior Publication Data

US 2023/0296791 A1    Sep. 21, 2023

Related U.S. Application Data

(60) Provisional application No. 63/269,594, filed on Mar. 18, 2022.

(51) Int. Cl.
| | | |
|---|---|---|
| *G06Q 10/083* | (2024.01) | |
| *G01S 19/39* | (2010.01) | |
| *G01S 19/47* | (2010.01) | |
| *G06Q 10/0835* | (2023.01) | |

(52) U.S. Cl.
CPC ............ *G01S 19/396* (2019.08); *G01S 19/47* (2013.01); *G06Q 10/08355* (2013.01)

(58) Field of Classification Search
CPC .. G01S 19/396; G01S 19/47; G06Q 10/08355
See application file for complete search history.

(56) References Cited

U.S. PATENT DOCUMENTS

| | | |
|---|---|---|
| 9,788,160 B1 | 10/2017 | Gu et al. |
| 10,259,466 B2 | 4/2019 | Memani et al. |
| 10,540,830 B2 | 1/2020 | Davidson et al. |
| 2010/0332127 A1 | 12/2010 | Imai et al. |
| 2011/0202305 A1 | 8/2011 | Willis et al. |
| 2014/0249938 A1 | 9/2014 | Garrett et al. |
| 2014/0351164 A1 | 11/2014 | Ballenger et al. |
| 2015/0045064 A1 | 2/2015 | Junkar et al. |
| 2015/0226563 A1 | 8/2015 | Cox et al. |
| 2016/0063005 A1 | 3/2016 | Sisbot et al. |

(Continued)

FOREIGN PATENT DOCUMENTS

| | | |
|---|---|---|
| WO | WO 2008/082628 A2 | 7/2008 |
| WO | WO 2017/128213 A1 | 8/2017 |

OTHER PUBLICATIONS

International Search Report and Written Opinion mailed Jul. 24, 2019 in International Application No. PCT/US2019/027853 filed Apr. 17, 2019.

(Continued)

*Primary Examiner* — Mathew Franklin Gordon
(74) *Attorney, Agent, or Firm* — Knobbe, Martens, Olson & Bear, LLP

(57) ABSTRACT

A system and method for improving accuracy of a mobile delivery device traversing a route. The system includes a mobile delivery device, a geolocation circuit and an inertial navigation system in communication with the mobile device, and a processor configured to compare accuracy indicators to thresholds to determine when to switch sensing the position of the mobile delivery device between the geolocation circuit and the inertial navigation system.

20 Claims, 9 Drawing Sheets

(56) References Cited

U.S. PATENT DOCUMENTS

| | | |
|---|---|---|
| 2016/0089080 A1 | 3/2016 | Li et al. |
| 2016/0224935 A1 | 8/2016 | Burnett |
| 2017/0337511 A1 | 11/2017 | Shroff et al. |
| 2019/0102840 A1 | 4/2019 | Perl et al. |
| 2019/0325388 A1 | 10/2019 | McLellan et al. |
| 2020/0294401 A1 | 9/2020 | Kerecsen |
| 2021/0108935 A1 | 4/2021 | Koohi et al. |
| 2021/0375074 A1 | 12/2021 | Deng |
| 2022/0169258 A1 | 6/2022 | Samarthyam et al. |

OTHER PUBLICATIONS

Reclus, Fabrice, and Kristen Drouard. "Geofencing for fleet & freight management." 2009 9th International Conference on Intelligent Transport Systems Telecommunications, (ITST). IEEE, 2009. (Year: 2009).

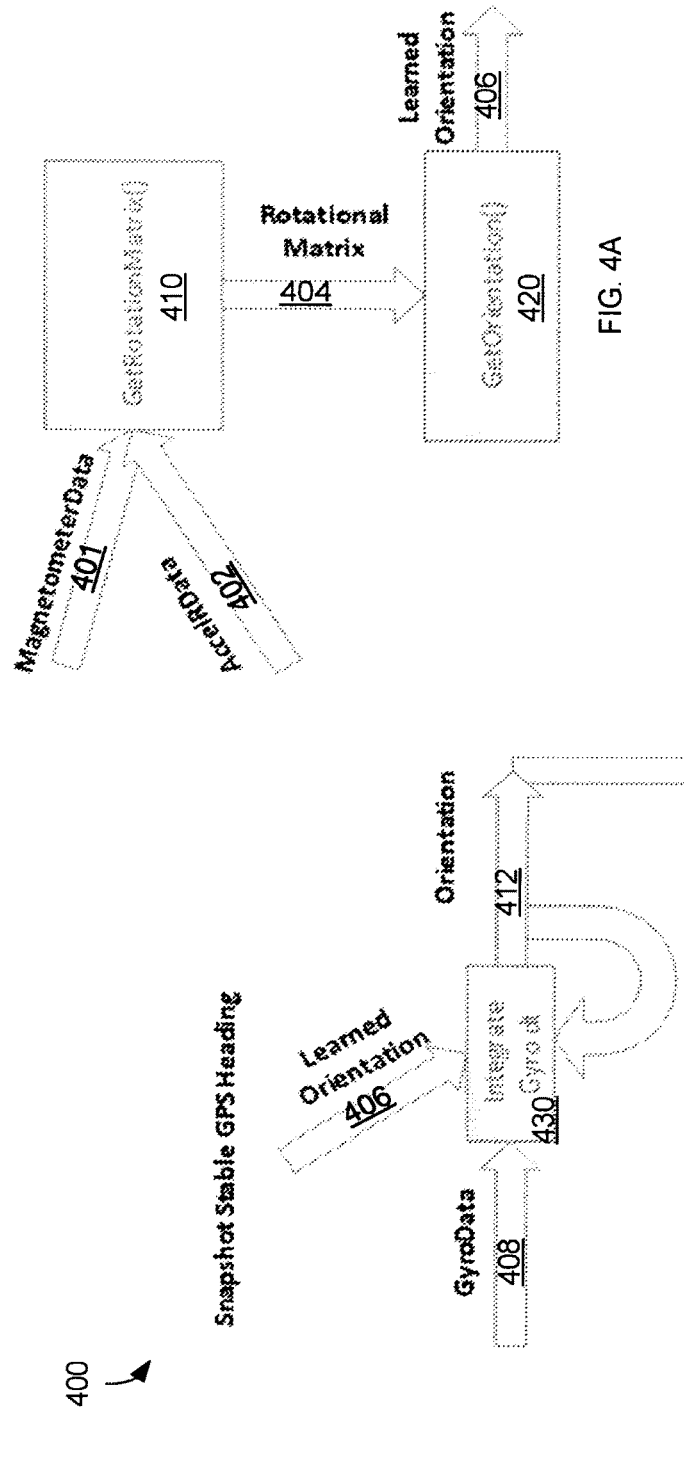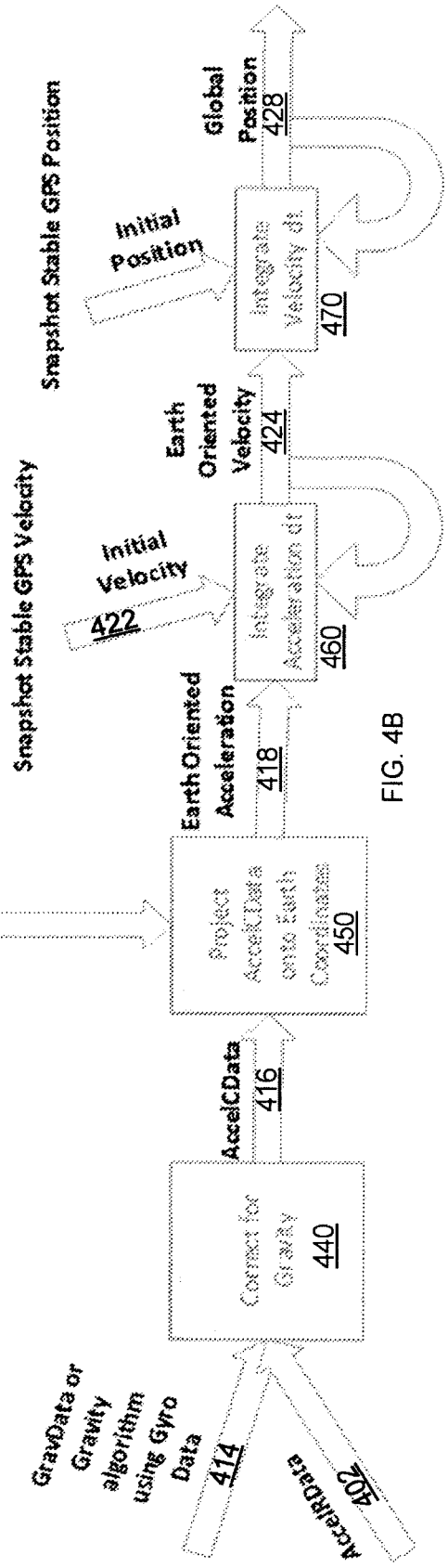
FIG. 4A
FIG. 4B

SYSTEMS AND METHODS UTILIZING MOBILE DELIVERY DEVICES IN ITEM DELIVERY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to U.S. Application No. 63/269,594, filed Mar. 18, 2022, the entire contents of which are hereby incorporated by reference.

BACKGROUND

Field

This disclosure relates to the field of transportation, delivery, and/or receipt of one or several items and to the field of communication, tracking, and control of the transportation, delivery, and/or receipt of distribution items in a distribution or logistics network. This disclosure also relates to analysis and optimization of delivery routes based on data received from devices used by delivery resources.

SUMMARY

In a first aspect, a method of improving accuracy of a mobile delivery device comprises sensing, in a mobile delivery device, a position of a mobile delivery device using a geolocation circuit; receiving, in a processor, a first indicator pertaining to accuracy of the geolocation circuit being used by the mobile delivery device traversing a route; comparing, by the processor, the first indicator to a first threshold; based on a comparison of the first indicator to the first threshold, transitioning to sensing the position of the mobile delivery device with an inertial navigation system; updating the position of the mobile delivery device along the route using the sensed position from the inertial navigation system; receiving, in the processor, a second indicator pertaining to accuracy of the geolocation circuit about the mobile delivery device; comparing, by the processor, the second indicator to a second threshold; and based on the comparison of the second indicator to the second threshold, transitioning back to sensing the position of the mobile delivery device by the geolocation circuit. In some embodiments, the first indicator is geolocation circuit drift of the sensed position of the mobile delivery device. In some embodiments, the first threshold is the position of the mobile delivery device sensed by the inertial navigation system. In some embodiments, the first indicator is the position of the mobile delivery device sensed from the geolocation circuit. In some embodiments, the first threshold is a predetermined distance from a specified point. In some embodiments, the first threshold is the mobile delivery device entering a geofence. In some embodiments, the first indicator is signal strength from the geolocation circuit of the mobile delivery device and the first threshold is a minimum signal strength. In some embodiments, the first indicator is a number of satellites from the geolocation circuit in communication with the mobile delivery device and the first threshold is a minimum number of satellites. In some embodiments, the second indicator is a number of satellites from the geolocation circuit in communication with the mobile delivery device and the second threshold is a minimum number of satellites. In some embodiments, the second indicator is the position of the mobile delivery device sensed from the geolocation circuit and the second threshold is a predetermined distance from a specified point sensed from the geolocation circuit.

In a second aspect, a system for improving accuracy of a mobile delivery device comprises a mobile delivery device traversing a route; a geolocation circuit in communication with the mobile delivery device configured to sense a position of the mobile delivery device; an inertial navigation system in communication with the mobile delivery device configured to sense a position of the mobile delivery device; and a processor in communication with the mobile delivery device. The processor may be configured to receive the position of the mobile delivery device sensed from the geolocation circuit, a first indicator pertaining to the accuracy of the geolocation circuit on the mobile delivery device, the position of the mobile delivery device sensed from the inertial navigation system, and a second indicator pertaining to the accuracy pertaining of the geolocation circuit. In some embodiments, the processor compares the first indicator to a first threshold and the second indicator to a second threshold to sense when to transition between the geolocation circuit and the inertial navigation system. In some embodiments, the system further comprises the first indicator is geolocation circuit drift of the sensed position of the mobile delivery device. In some embodiments, the first threshold is the position of the mobile delivery device sensed by the inertial navigation system. In some embodiments, the first indicator is the position of the mobile delivery device sensed from the geolocation circuit. In some embodiments, the first threshold is a predetermined distance from a specified point. In some embodiments, the first threshold is the mobile delivery device entering a geofence. In some embodiments, the first indicator is signal strength from the geolocation circuit of the mobile delivery device and the first threshold is a minimum signal strength. In some embodiments, the first indicator is a number of satellites from the geolocation circuit in communication with the mobile delivery device and the first threshold is a minimum number of satellites. In some embodiments, the second indicator is a number of satellites from the geolocation circuit in communication with the mobile delivery device and the second threshold is a minimum number of satellites. In some embodiments, the second indicator is the position of the mobile delivery device sensed from the geolocation circuit and the second threshold is a predetermined distance from a specified point sensed from the geolocation circuit.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with the additional specificity and detail through use of the accompanying drawings.

FIG. 4A is a design flow for the design of an inertial navigation system (INS) using gyroscope data.

FIG. 4B is a design flow for determining a location through an INS using gyroscope data.

DETAILED DESCRIPTION

Figure 1:
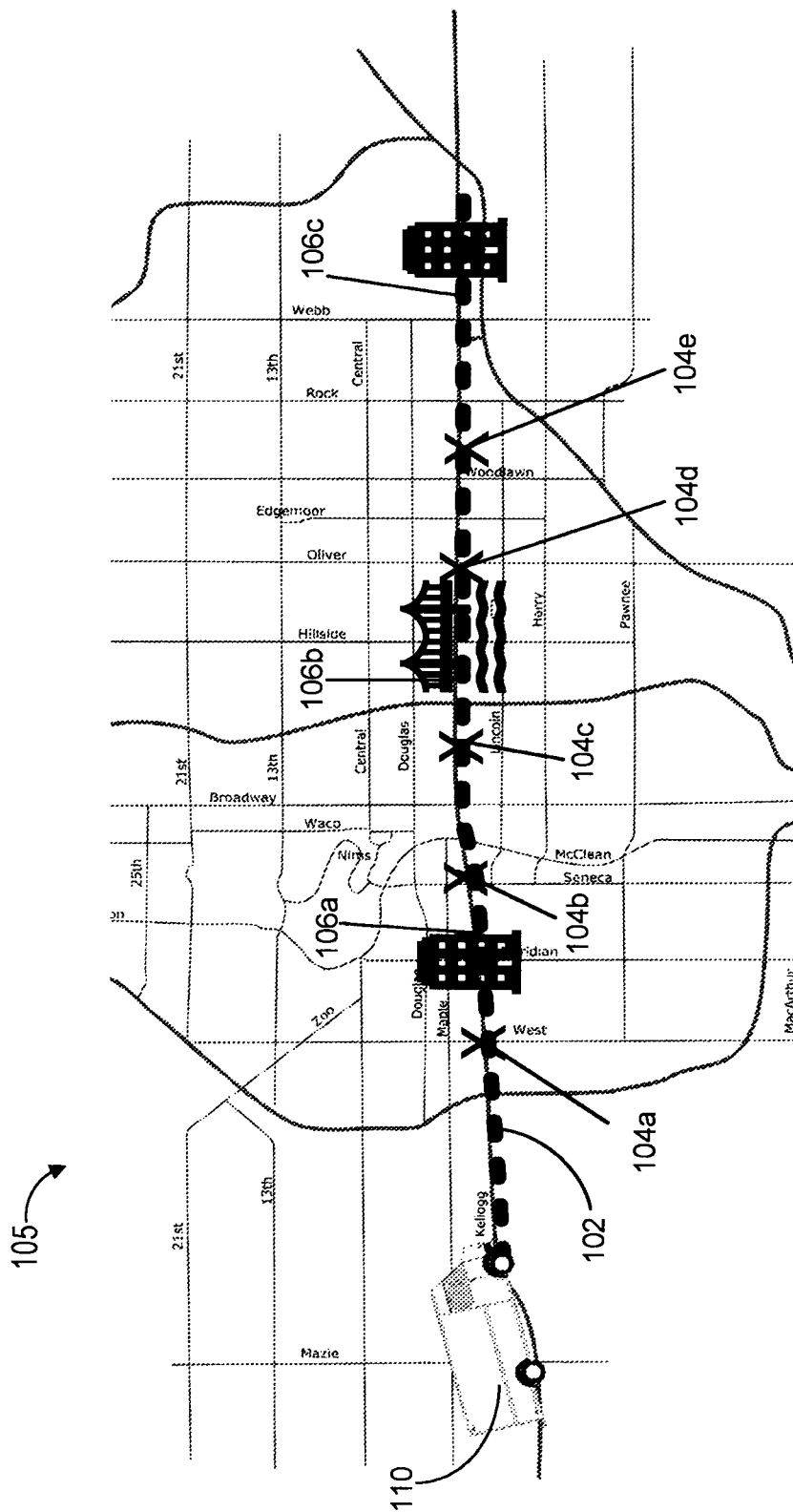
FIG. 1 is an overview diagram of a geographic region in which a delivery system is implemented.

The following detailed description is directed to certain specific embodiments of the development. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The technological shortcomings of global positioning system (GPS) data or other similar positioning systems can cause errors and inaccuracies in tracking and delivering items in, for example, a distribution or logistics network. For instance, GPS may be inaccurate in areas with tall buildings or trees, or areas with large elevation differences. GPS may be inaccurate or unavailable indoors. Because of these technical challenges related to GPS, systems and methods described herein improve on the technical shortcomings and improve overall the technical fields of tracking and logistics in areas where GPS may be inaccurate or unreliable. Delivery resources, such as mail persons, trucks, ships, vessels, drones, mobile devices, and the like benefit from improved positioning. Delivery resources use positional information to improve delivery routes, decrease delivery time, and decrease costs and personnel.

Delivery resources, such as carriers, vehicles, mobile delivery devices, rolling stock, automated guidance vehicles, drones, and other delivery resources, can be assigned to static routes, or sequences of stops at delivery points such as addresses, to which they deliver items on a regular basis. The static routes can include the same delivery points each day. In some aspects, a delivery route may be a dynamic route that includes different delivery points each day, or a hybrid route which includes some static points and includes some dynamically chosen points for a delivery day.

The movement of distribution items along these routes can be tracked with different tracking devices. These devices can use GPS data, gyroscopic data, and/or accelerometer data to determine positions, lines of travel, paths, etc. of delivery resources at a point or along a route. However, some routes can be significantly more difficult than others, such as routes that go through areas where geolocation systems are inaccurate or unreliable, such as in an area with tall buildings, indoors, underground, tunnels, and the like. To improve the accuracy and efficiency of tracking and delivery, or routes that take delivery resources inside buildings, systems and methods of the present application can add gyroscope data and/or accelerometer data from a mobile delivery device to the system for route analysis can improve the delivery device when geolocation systems, such as GPS, are not available. Additionally, a mobile delivery device alone or in communication with one or more servers, can analyze the accuracy and/or availability of GPS sources and gyroscope data and determine how and when to switch between a GPS based tracking system and an inertial navigation system according to the accuracy and availability of data sources.

Analysis and/or optimization of delivery routes based on mobile device analytics may involve intensive computing resource use. The analysis and/or optimization of the delivery routes may utilize data received from devices associated with delivery resources (delivery resources can be, for example, delivery vehicles, carriers, mobile delivery device, etc.). The data may include GPS data points or breadcrumbs, gyroscope data, time information/data, device health related information/data, orientation data for the device, accelerometer data for the device, and/or travel related information/data. The embodiments described herein may utilize such data to determine location, actions taken by the delivery resource on the delivery route, estimated delivery times, item tracking, and aspects or features of the delivery route. In some embodiments, the systems and methods disclosed herein determine one or more actions taken or activities performed by a delivery resource as it moves through the distribution network, or, for example, along a static delivery route.

In some embodiments, the systems and methods for route analysis described herein analyze a route as serviced and/or traveled on one day based on data from equipment or devices used by or associated with the delivery resource that services that route. The analysis can occur in real time and can include, for example, comparing GPS and inertial navigation information and selecting a more accurate or reliable source. In some embodiments, multiple routes and/or more than one day of delivery can be analyzed. In some embodiments, the analysis occurs every night or every week or at any other selectable interval. The route analysis may provide for evaluation of the delivery resource's route by comparing GPS information to gyroscope information and constructing a route using the more accurate system for different portions for a route. Information derived from and/or otherwise identified from the route analysis of a particular route as serviced/traveled by the corresponding delivery resource may be used to optimize and improve operations. For example, the information from the route analysis may be used to optimize one or more of the route, the activities of the route deliverer, and so forth. More specifically, a route may be altered on a later day to account for inaccuracies, errors, obstacles, and the like that may have been encountered, recorded, and identified on a prior delivery day. Details regarding core functionality of the route analysis, including details regarding a variety of functions and algorithms, are described below. For example, if the route data shows that a GPS based route and a gyroscope or inertial navigation system (INS) route path diverge by a threshold amount, or have data inaccuracies at a threshold amount, the inaccurate or less accurate route path can be discarded and a final route can be created by using the most accurate system for a given route segment.

In some embodiments, a server may analyze the route paths from the GPS and INS data, and may change a route, or an order of stops along a route, or may change a direction of travel, in order to ensure the route follows a route path that uses the most accurate systems as much as possible. In some embodiments, a route may be determined using a combination of GPS and INS data. For example, where a route changes elevation, which may not be accurately detected by GPS alone, the combination of GPS and gyroscope and INS data proves a better picture of the actual route traversed by a delivery resource, including ascending or descending stairs, ramps, hills, etc.

As used herein, the term "item" may refer to discrete articles in the distribution network, such as mail pieces, letters, flats, magazines, periodicals, packages, parcels, goods handled by a warehouse distribution system, baggage in a terminal, such as an airport, etc., and the like. The term item can also refer to trays, containers, conveyances, crates, boxes, bags, and the like. As used herein, the term "carrier" or "delivery resource" may indicate an individual assigned to a route who delivers the items to each destination and may be used interchangeably. The terms may also refer to other distribution network resources, such as trucks, trains, planes, automated handling and/or delivery systems, and other components of the distribution network. The present disclosure also relates to systems and methods to analyze items sent from or received in a geographic area to identify potential information regarding the item that may provide additional revenue streams for the distribution network.

In some embodiments, the delivery service(s) may deliver and/or pick up items over a large geographic area that is divided into one or more delivery routes. In some embodiments, the route(s) may be generated based on address information only when reviewing the geographic area. Accordingly, the routes may not account for variances or details that are particular to addresses or delivery points, which terms may be used interchangeably. For example, the route(s) may mistakenly view an apartment building as including only one actual delivery stop or point while, in actuality, each apartment actually has its own delivery stop or point. When entering a building, such as an apartment complex, a downtown area with high-rise buildings, travelling through a tunnel, GPS signal may be lost, or bounced around within or among buildings. In this case, the position and movements of the delivery resource, and actions at delivery points for each delivery address may be inaccurate. Further, a distribution system may use a real-time or near real-time position of a delivery resource to set or update an estimated delivery time, or to provide tracking info. When a GPS signal is lost, it may not be possible to provide accurate tracking information, updated delivery times, etc. Accordingly, systems and methods described herein can determine a most accurate positioning system and can automatically switch from GPS data received to gyroscope data (INS data) from delivery resources in order accurately continue tracking the movements throughout areas where GPS signal may be lost or becomes inaccurate, and to provide customers with updated delivery times or other similar information.

As one exemplary distribution network, the United States Postal Service (USPS) uses a route analysis tool (RAT) to process breadcrumb data and other route data, and to produce route information and safety exceptions. RAT can operate in a cloud environment with multiple instances of the software operating each on its own processor processing one route daily. The RAT tool can be similar to the systems and methods described in U.S. patent application Ser. No. 17/067,498, which is hereby incorporated by reference. A Mobile Delivery Device (MDD) can be used to capture data processed in RAT. MDD can also refer to the application or software running on MDDs that captures the GPS and accelerometer data for the RAT. The Carrier Alert Subsystem (CAS) is a service on the MDD that communicates with the MDD application to alert the carrier or upcoming delivery event. CAS receives data from MDD, processes it and returns carrier alert status. CAS is an application or a service running within the handheld operating system. Features of a CAS can be similar to those described in application Ser. No. 16/384,393, which is hereby incorporated by reference.

Addition of gyroscope data to GPS and accelerometer can supplement the GPS and accelerometer data being used and processed in RAT. The use of the gyroscope data can improve RAT's localization and positioning efforts, and improves the technical process of identifying a device's physical location. Additionally, GPS tends to overshoot turns and delay heading changes which means that route analysis results in a tool such as RAT can result in ambiguities or inaccurate positions. Gyroscope data can have more accurate cornering and is more responsive to heading and elevation changes which in turn can help with localization. In addition, using gyroscope data with accelerometer data can be used an INS. The INS can also localize and identify positions and routes when a delivery resource navigates within buildings and under poor or no GPS satellite communications.

Gyroscope data may also be useful for positioning a delivery resource going up and down hills or flights of stairs within a building, movement that is less accurate and more difficult to detect using GPS. Especially when a delivery resource is moving slowly within a vehicle or is moving on foot, accelerometer and gyroscope data may help account for movements when GPS is unable.

Using gyroscope data enhances detection of changes to direction and orientation of the device. The gyroscope data combined with a gravity algorithm produces a better interpretation of the orientation of the device. The INS produced with the gyroscope data would allow tracking of movement within buildings and wherever there are poor and highly reflected GPS Satellite signals.

FIG. 1 is an overview diagram of a geographic region 105 in which a localized delivery network is implemented. The delivery network includes or utilizes a delivery resource 110 traveling across the geographic region 105. As shown in FIG. 1, the delivery resource 110 is represented as a delivery vehicle. Alternatively, the delivery resource 110 represents alternative types of delivery resources. At any particular time, the delivery resource 110 may be located along a route 102 by the delivery system. One or more other delivery vehicles (not shown) may travel across the geographic region 105 along one or more route(s). In some embodiments, the delivery resource 110 may be part of one or more transportation services and may travel according to one or more delivery routes that are static and predetermined or dynamic and variable.

The route 102 may comprise one or more stops 104a-104e for the delivery resource 110 within the geographic region 105. The delivery resource 110 may travel along the route 102 and stop at the one or more stops or delivery points 104a-104e to pick up or drop off one or more items. In some embodiments, the stops are at businesses, residences, delivery locations. Accordingly, the stops may be located in close proximity to each other or with large distances between one or more of the stops. Though the route 102 as shown is generally straight, the route 102 may include any number of turns, stops, etc. In some embodiments, the route may be a static route, meaning the route is fixed and delivers to the same delivery points each day, the delivery points being a subset of all the delivery points in a geographic area. In alternative embodiments, the route 102 may be dynamic and vary each day, as well as the number and location of stops.

The route 102 may also comprise one or more areas, segments, or points 106a-106c within the geographic region where GPS signal is poor. The delivery resource 110 may travel along the route 102 and pass through the one or more points 106a-106c where GPS signal is poor, unavailable, unreliable, or inaccurate. In some embodiments, the points are areas of the city with tall buildings surrounding the route 102 where a GPS signal is bounced from building to building and becomes inaccurate, underground paths, garages, or inside buildings. In some embodiments, points 106a-106c can be apartment buildings, commercial complexes, warehouses, etc., where a delivery resource may be moving inside a building or where GPS is unreliable, unavailable, or inaccurate. When GPS signal is poor, the delivery resource may be unable to receive or transmit positioning data about that location.

The delivery system experiences various costs for use of the delivery resource 110, either via a contract with a third-party or directly through a driver, operator, etc. (for example, the carrier or delivery resource), that is associated with the delivery system (for example, an employee of the delivery system). The delivery system uses the route 102 to estimate the costs of the delivery resource 110 and driver, etc. For example, the delivery system uses the route 102 to estimate an expected amount of time of travel along the route 102 and servicing of the stops 104a-104e and uses this estimated amount of time to then generate the cost for the route 102, which may include a wage for the driver/operator, costs of the delivery resource 110, etc. Accordingly, accurate information regarding the route 102 is essential in estimating an accurate cost for the route 102. Furthermore, while the route 102 accounts for stops at each address along the route, in everyday operation, only a subset of the stops may generally be required, and the information regarding the route 102 may account for either the full route 102 (with all stops) or only an average of the subset of stops generally required. The delivery system may include one or more components that utilize information from the delivery resource 110 to generate and/or update the route 102 along which the delivery resource 110 travels to pick up and distribute items.

The disclosed methods and systems can be used on a local level, such as depicted in FIG. 1, and can be used on a city or town level, a county level, a state level, a regional level, a national level, or with any desired geographic area.

Figure 2:
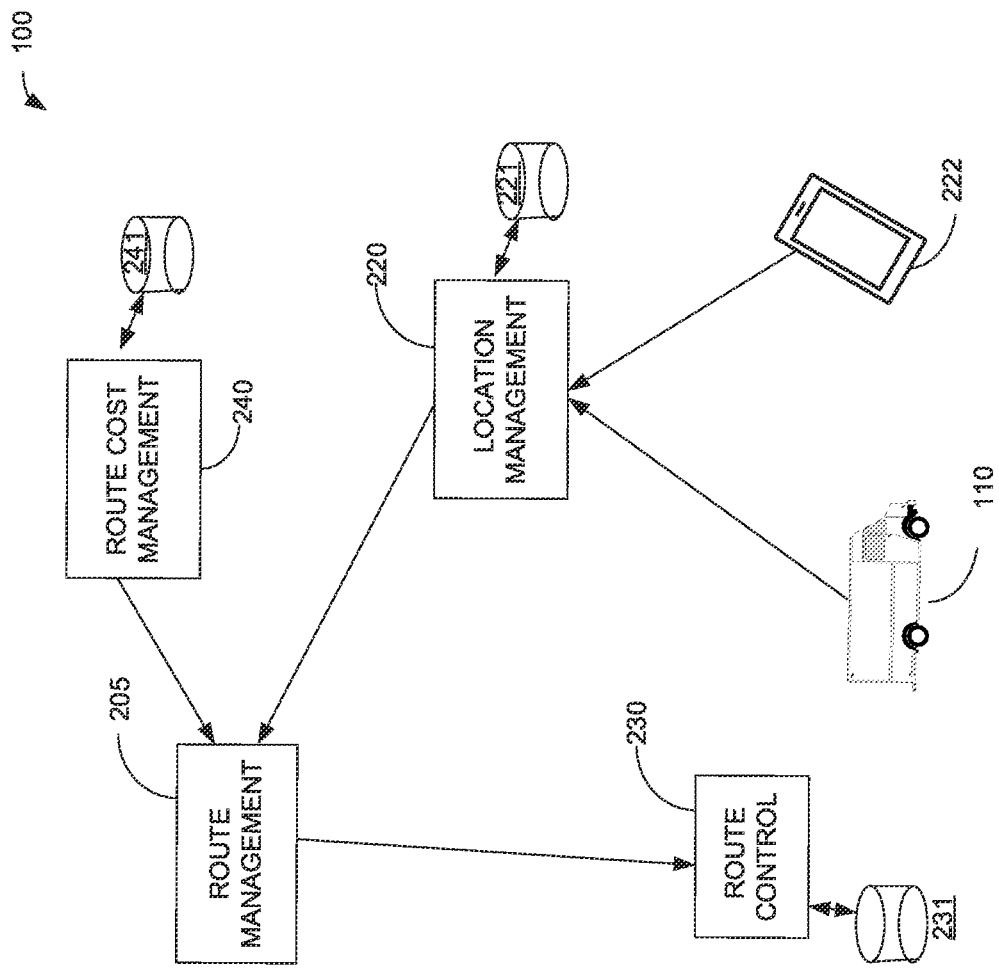
FIG. 2 is an exemplary block diagram of a portion of the delivery system.

FIG. 2 is an exemplary block diagram of a portion of a delivery system 200. The delivery system 200 includes a route management component 205, a location management component 220, a route control component 230, and a route cost management component 240.

In some aspects, the route management component 205 comprises a processor or similar data processing component or circuit that is able to receive location information, such as Global Positioning System ("GPS") information, gyroscope data, accelerometer data, and/or time information, or any combination thereof.

In some aspects, the location management component 220 receives information via a communication link from one or more delivery resources 210. The delivery resource 210 can be similar to those described elsewhere herein. In some embodiments, the location management component 220 preprocesses the received information as needed. In some embodiments, the location management component 220 may perform one or more of the processes described herein by implementing one or more of the described algorithms. In some embodiments, the location management component 220 may store information (for example, received GPS information and gyroscope data) in a vehicle location database 221. In some embodiments, the location management component 220 may be a module operating on a server of the distribution network or may be embodied as hardware or software on the mobile delivery device (MDD) 222. In some embodiments, the location management features of the location module component 220 are performed in part on the MDD 222 and on a server of the distribution network remote from and in communication with the MDD 222.

In some aspects, the route control component 230 is in communication with the route management component 205. The route control component 230 receives information about different routes that the delivery resource 210 has travelled before or will take at any point. The route control component 230 stores that information in a route database 231. The route control component 230 uses location information from the location management component which can include GPS data and/or gyroscope to update and/or adjust the course of the route. In some embodiments, the route control component can be in direct communication with the location management component or may communicate through the route management component 205.

In some aspects, the route cost management component 240 may determine and/or track costs of the routes 102. Route cost can be determined based on a distance travelled by a delivery resource, a time of route completion, energy costs, and the like. Costs can include monetary costs, time costs, effects on delivery resources such as carriers, including route difficulty, etc.; effects on vehicle, for example, the number of U-turns, left turns, reversing, speed limits, etc.; elevation, terrain, etc. Cost components of the delivery routes may be used to evaluate the routes, for example, to determine how to adjust them to make them more efficient, safe, and/or cost effective. Details of the route cost may be saved in a route cost database 241.

In some embodiments, the delivery system 100 may gather carrier data from the MDDs 222 to make its routes 102 more efficient. For example, the delivery system may monitor efficiencies of existing routes 102, monitor efficiencies of delivery resources 210 on their routes 102, and determine how to improve existing routes 102, combine existing routes 102, and generate new routes 102. In some embodiments, such changes and/or improvements may be made based on an analysis of information regarding the routes 102 and based on GPS information received from delivery resources 210 traveling along their routes. This can include, for example, minimize energy expenses by minimizing elevation changes, minimizing vehicle idle time, and the like. Improvements can also include changing the allocation of delivery points among several delivery routes to minimize costs. These adjustments are exemplary only, and one of skill in the art, guided by this disclosure, would understand that other changes could be made without departing from the scope of the current disclosure.

In some embodiments, the route management component 205 can receive input from the various components of the system 100 and can determine, set, revise, and/or update a delivery time or delivery window estimate as the location of the delivery resource, such as the MDD 222 is received. In some embodiments, the route management component 205 can determine whether a delivery service class or delivery standard is in jeopardy based on the location of the delivery resource and can instruct the route control component 230 to adjust the route if needed. If a system relies solely on a GPS location system to determine the location of a delivery resource, an accurate estimate or a determination of meeting a delivery service requirement may not be possible when the delivery resource is in or moves through areas where GPS is not available, is unreliable, or inaccurate.

Details of how gyroscope information from the gyroscope device of the delivery resource 210 can be used in conjunction with existing routes are described below. As noted above, gyroscope data information may be received from the gyroscope devices of the delivery resource 210. In some embodiments, where the delivery resource 210 includes the delivery vehicle, two devices can provide GPS readings and gyroscope readings, as described above. For example, some hardware integrated into the delivery vehicle 210 may send a first GPS signal, and a mobile delivery device (MDD) having a GPS circuit and gyroscope can send a second GPS signal and gyroscope and/or accelerometer reading. The systems and methods for analyzing routes may utilize the data received from the MDD or a similar device used by the item deliver or carrier. The data from the MDD may be collected each day for analysis once the carrier completes the route for that particular day. The data from the MDD is cleansed and/or filtered before being analyzed as described below.

Figure 3:
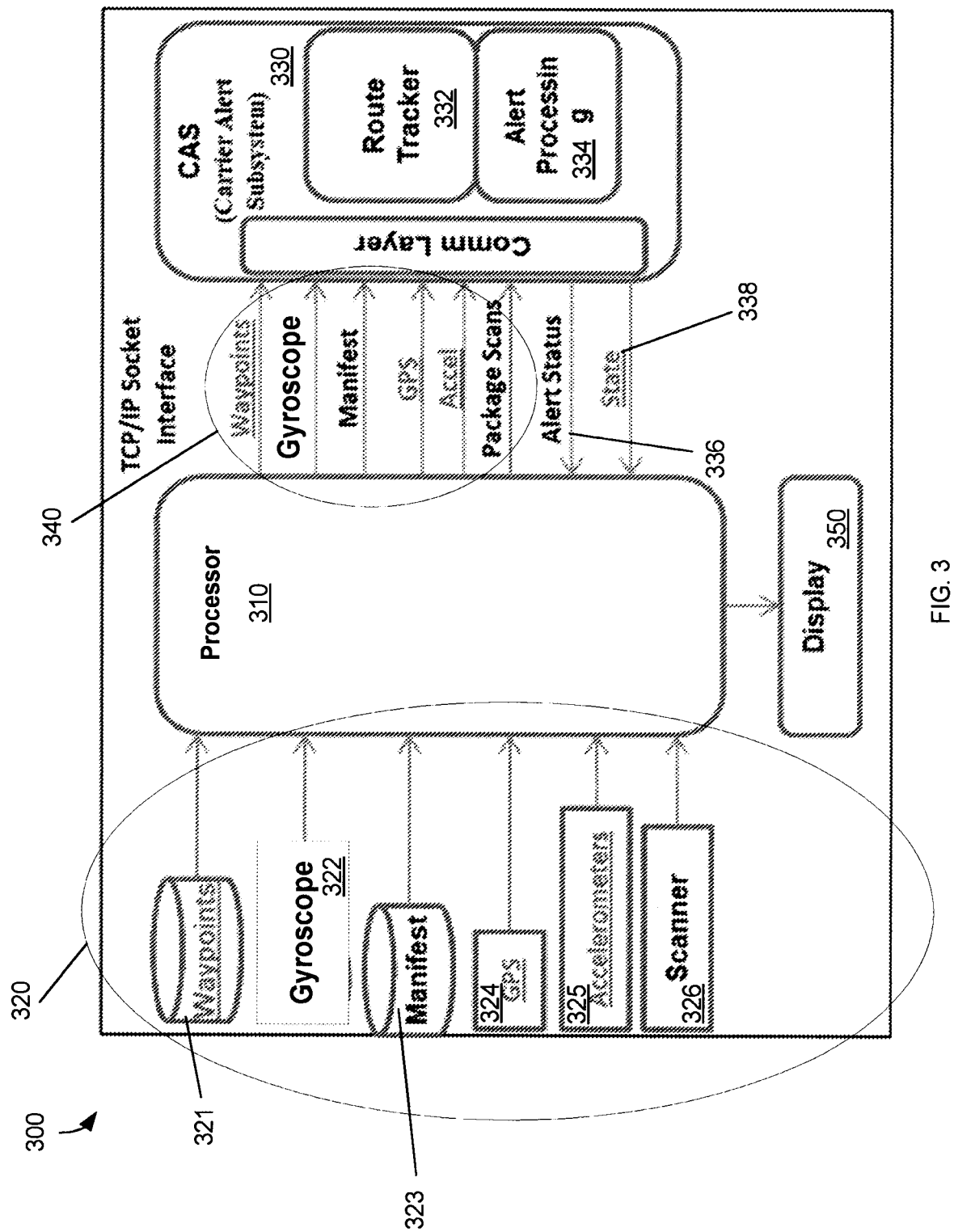
FIG. 3 is a diagram of the relationship between data communicated to a processor and a Carrier Alert Subsystem.

FIG. 3 is an exemplary data flow diagram depicting data flows within systems described herein. A system 300 comprises a processor 310, input data 320, a carrier alert subsystem (CAS) 330, output data 340, and a display 350. The communications and the transmission of data between components of the system 300 can be wired or wireless or a combination of both.

The processor 310 can be a server of a distribution network or can be a processor of a mobile delivery device receives input data 320. In some embodiments, the input data 320 includes data from a waypoint database 321, a gyroscope 322, a manifest database 323, GPS 324, an accelerometer 325, and a scanner 326. The gyroscope 322, the GPS 324, the accelerometer 325, and the scanner 326 can be embodied on a mobile delivery device, similar to those described elsewhere herein, in a vehicle, or otherwise as part of a delivery resource. The waypoint database 321 and the manifest database 323 can be stored locally on a mobile delivery device or can be stored remotely.

The input data 320 has a variety of input variables. The waypoint database 321 includes waypoints that are established or identified points along a delivery route 102 like delivery points, such as the one or more stops 104a-104e and one or more points 106a-106c, or other points along a route where a delivery resource takes an action, such as makes a turn, a stop, a vehicle exit or entry, enters an apartment building, goes underground, etc. In some embodiments, waypoints may be a subset of delivery points or action points along a delivery route. The processor can use this information to determine the progress of a delivery resource along a route, to confirm the resource is along a route, to update delivery progress or delivery estimates, and the like.

The gyroscope 322 collects gyroscope data including vectors and acceleration components and using communication features of the mobile delivery device, or the vehicle transmits the information to the processor 310 on a real-time or near real-time basis. In some embodiments, the data is transmitted at the end of a shift, at the end of the day, or on some other periodicity. The gyroscope data may be used to determine the location and/or route of a delivery resource, such as a mobile delivery device, as it moves in an area where the GPS 324 is unavailable, or unreliable, or inaccurate.

The manifest database 323 includes a listing of items and the item characteristics for items that are to be delivered. A listing of items and item characteristics in the manifest database 323 is used to help accurately track stops along a route. For example, if an item is large and heavy parcel it may take longer to be delivered at a point than if the item is an envelope. Using item characteristics can give a more accurate expected delivery time for each item.

The GPS 324 determines a device location using signals from GPS satellites. The location of the device can be sent to the processor 310 similar to the gyroscope data. Using the GPS data, the processor 310 can identify the position of a delivery resource with regard to a route, a delivery point, an item in the manifest database 323, and the like.

The accelerometer 325 detects acceleration data of the device and communicates to the processor 310 as described elsewhere herein. The accelerometer 325 can identify motion of a device and can be used to determine position and movement of a device when GPS 324 is unavailable or unreliable.

The scanner 326 is used to scan items or computer readable codes, for example, when an item is delivered, when a delivery resource is at a delivery route, etc. The scanner 326 can communicate the event of a scan to the processor 310 using methods described herein. The scanner 326 can communicate the time of a scan event to the processor 310. The processor 310 can determine a location or position of a delivery resource at the time of a scan event using the communicated information. In some embodiments, the scan event occurs whenever an item, such as a package is scanned using the scanner 326 either at a pickup location or a drop-off location.

In some embodiments, the processor 310 receives the input data 320 that is collected from a delivery source 110 and processes the input data 310 to analyze the position. In some embodiments, the processor then sends the processed output data 340 to the CAS 330. CAS 330 can receive the output data 340 from the processor 310 and can alert a delivery resource regarding the location of the delivery device along a route. The output data can include waypoints, gyroscope data, manifest data, GPS data, accelerometer data, package scans, and other data. CAS 330 processes the output data 340.

The CAS 330 receives the processed output data 340 and analyzes using a route tracker 332 and an alert processing mechanism 334. The CAS 330 sends back an alert status 336 and state feedback 338 on the route.

The alert processing module 334 identifies location of the delivery resource using the received output data 340 and provides alerts that indicate that an item from the manifest is to be delivered at a delivery point comprising hazards, delivery delays, and/or where a delivery resource needs to take different action or supplemental action.

In some embodiments, route state feedback 338 may include position along the route, changes to be made along the route, delays to be expected based on but not limited to, weather conditions, traffic conditions, road closures, etc.

In some embodiments, the CAS 330 has a route tracker 332 and alert processing module 334. The route tracker 332 of the CAS 330 takes the output data 340 and assesses the delivery resource along the route in order to continue tracking the delivery resource. The route tracker 334 can assess the expected location with the GPS location of the delivery resource. Then, the route tracker 334 can send the changes to the alert processing module 336 which then sends alert status 336 to the processor 310. In some embodiments, CAS 330 can perform the route position and INS calculations described herein.

The processor 310 can receive the state feedback data 338 from the route tracker 332, and can use this data to analyze, evaluate, and optimize routes as described herein. The processor 310 can also analyze the accuracy of the input data 340 and determine whether or when to use GPS data or gyroscope data, or a combination of both to determine location information for a delivery resource. In some embodiments, the processor 310 performs this operation in conjunction with the CAS 330. This process can also be performed on an MDD in full or in part.

FIG. 4A is a portion of flowchart for a method 400 of using gyroscope data from an MDD as an INS. The method 400 is depicted in FIG. 4A and FIG. 4B. In some embodiments, the steps and data described herein with regard to method 400 can be performed completely or partially on the MDD, a server of the distribution network such as the processor 310, or in other components alone or in combination.

Referring now to FIG. 4A, the method 400 begins at block 410 where a learned orientation 406 is determined given certain initial conditions. The learned orientation 406 determines an initial position and orientation of a device within three-dimensional space. The initial conditions needed are initial position, initial velocity, and initial orientation. These initial conditions can be gathered through a magnetometer and an accelerometer as part of the device and may use the gyroscope. A magnetometer is used to measure the intensity and direction of a magnetic field. The data gathered through the magnetometer is input data MagnetometerData 401. An accelerometer measures the acceleration of motion of a device. The data gathered through the accelerometer is raw input data AccelRData 402. The initial conditions can then be run through the function GetRotationMatrix( ) 410.

The method 400 at block 410 utilizes a GetRotationMatrix( ) function to compute a rotational matrix 404 using the MagentometerData 401 and the AccelRData 402 to transform a vector from the device's internal coordinate system to the world's or an external coordinate system. The output of the GetRoationMatrix( ) 410 is a rotational matrix 404. The GetRotationMatrix( ) function may be built in to the MDD, may be an Android® or iOS® function.

The method 400 moves from block 410 to block 420. The output of the GetOrientation( ) function in block 420 is Learned Orientation 406. Learned Orientation 406 uses the accelerometer data, gyroscope data, and GPS positioning to determine the orientation of the device in a three dimensional coordinate space in which the device is located. The GetOrientaiton( ) function may be an Android® or iOS®, or similar function.

Figure 4C:
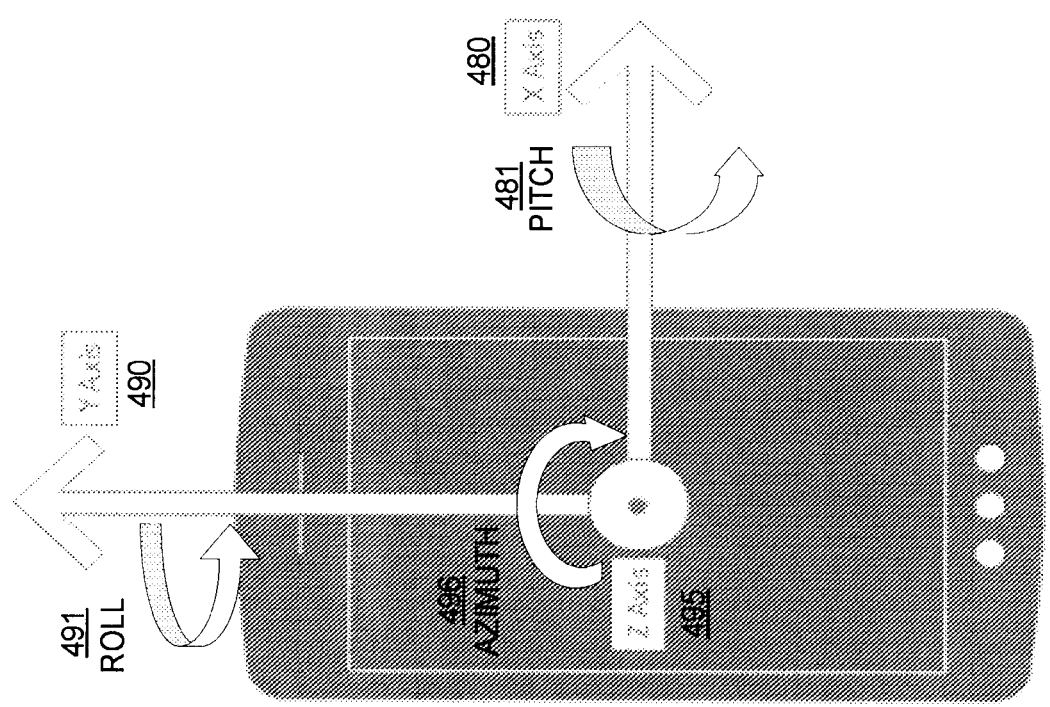
FIG. 4C is a diagram of the orientation axes of a delivery device.

Referring now to FIG. 4B, the method 400 continues. The method 400 in FIG. 4B is a design flow for determining a location of an MDD through an INS using gyroscope data. The method 400 proceeds from block 420 where the GetOrientation( ) function is performed and the learned orientation 406 is generated, and moves to block 430. Gyroscope data 408 is received from a delivery resource, such as the MDD with a gyroscope. In block 430, the gyroscope data is integrated with respect to time. Gyroscope data gives the rate of change of the angular position of the delivery device over time. That output gives the derivate of the angular position over time. To obtain the angular position of the delivery device, the gyroscope data 408 is integrated. The output at block 430 of device orientation 412 is in terms of azimuth, pitch, and roll with the ranges and limitations as described below. This will be described in further detail with regard to FIG. 4C.

The GetRotationalMatrix( ) and GetOrientation( ) functions may not coincide with the rotational gyroscope directions. Orientation origins using the magnetometer are as follows (as shown on FIG. 4C): azimuth 496, when pointing the top of the device toward North is 0 and pointing the top of the device to the East would be +Pi/2 radians. Pitch 481 when placing the device so that it is lying flat on the table parallel to the Earth's surface is 0 and placing the device with the top of the device pointed directly upward (opposite of the force of gravity) is −Pi/2 radians. Roll 491, placing the device so that it is lying flat on the table parallel to the Earth's surface on the device's back is 0 and placing the device with the right side pointed upward is −Pi/2 radians.

Referring back to FIG. 4B, in block 430, the gyroscope defines rotation of the azimuth 496 as positive in the counterclockwise direction. The azimuth 496 rotation is subtracted from the learned orientation 406 to correct for this difference. Next the pitch 481 rotation is positive when the top of the device is rotated from flat on the table orientation. To account for this position, the pitch rotation is subtracted from the learned orientation 406. The roll rotation corresponds with the original orientation, so it is added to the learned orientation 406.

In block 330, a processor, such as processor 310 or CAS 330 receives the gyroscope data 408 via a socket interface and uses it in the INS position calculation algorithm. In some embodiments, once every second the processor logs the INS position data to a KML file. In some embodiments, the KML file can be used to plot GPS and INS positions over a satellite image of the earth.

In some embodiments, at block 430, gyroscope data 408 is filtered or smoothed using a low pass filter implemented to reduce the noise on the raw gyroscope and accelerometer data. In some embodiments, the gyroscope data can be filtered using Equation 1. Equation 1 provides the low pass filter:

$$\text{FilteredData} = \text{FilteredData} + \text{Alpha} * (\text{NewData} - \text{FilteredData}) \quad \text{Equation 1}$$

The output of the data filtered or smoothed using a low pass filter is FilteredData. The NewData is the raw gyroscope 408 and accelerometer data 402. The Alpha constant is a number used to suppress noise in the NewData. The Alpha constant has a range of 0.0 to 0.1. A normal value for Alpha is about 0.1.

In some embodiments, a smoothing function of Equation 2 is also used. Equation 2 is a smoothing average function implemented to try and smooth the raw gyroscope and accelerometer data shown below:

$$\text{RunningTotal} = \text{RunningTotal} + (\text{NewData} * \text{DeltaTime}) - \text{OldStoredData[index]} \quad \text{Equation 2}$$

In the smoothing function, the RunningTotal is the running total time at the beginning of the NewData until the end of a designated route travel time or predetermined interval of time for a desired output. DeltaTime is the time from the last gyroscope sensor data to the current sensor data time.

In block 430 the processor also calculates orientation of the device using the gyroscope data that uses starting orientation, filtered angular velocity, and DeltaTime (dt), from the last gyroscope sensor data time to the current sensor data time. The raw gyroscope data is separated into the Azimuth, Pitch, and Roll rotations to be used as NewGyroscopeZRotation, NewGyroscopeXRotation, and NewGyroscopeYRotation. The delta orientation change is determined by incorporating the angular velocity of the orientation of the device around all three axes (X,Y,Z) in terms of OldAzimuth, OldPitch, and OldRoll and integrating it over DeltaTime. Then, adding the change in orientation to the current orientation, a new orientation can be found. The new orientation is outputted as NewAzimuth, NewPitch, NewRoll. Equations 3.1-3.3 represent the calculation of the new orientation.

NewAzimuth=OldAzimuth+
(NewGyroscopeZRotation*DeltaTime)

NewPitch=OldPitch+
(NewGyroscopeXRoation*DeltaTime)

NewRoll=OldRoll+
(NewGyroscopeYRoation*DeltaTime)　　　Equations 3.1-3.3

In a parallel path of method 400, in block 440, accelerometer data and gravity data are used as an input to a function to correct for gravity in block 440. In block 440, the gravity sensor data from the device is collected using the gyroscope. The gravity data 414 collected is subtracted from the acceleration data 402. Gyroscope data along with accelerometer data is used to calculate the acceleration due to gravity on all three axes (X, Y, Z). Then an algorithm using the accelerometers and gyroscope data is used to remove the gravity effect on the gyroscope and accelerometer data. Further detail regarding a mobile delivery device and its axes is shown in FIG. 4C and described below.

On an exemplary MDD, the gyroscope data is available from the device's accelerometer sensor using a software sensor interface. The gyroscope collects the data, writes it to a new log file, processes it via a processor. The data can be communicated to the CAS 330. Using the device's gyroscope interface, the processor collects the gyroscope data roughly once every 200 milliseconds. This data is written to a gyroscope log file. The processor can communicate this data to the CAS 330 in near real time for use in INS position calculations. The gravity correction algorithm in block 440 produces AccelCData 416. Table 1 is an example of the output AccelCData 416 in the gyroscope log file where R is the angular velocity of Roll, P of Pitch, and Y of Yaw or Azimuth. The data collected in the table below is outputted data from block 440 that is corrected for gravity.

| Date | Time | Output |
| --- | --- | --- |
| January 1929 | 10:30:16.990| | [R = 0.558655, P = -0.237800, Y = 2.468922] | |
| January 1929 | 10:30:17.162| | [R = -1.330630, P = 0.700286, Y = 0.410904] | |
| January 1929 | 10:30:17.354| | [R = -0.385551, P = 6.488789, Y = 1.782625] | |
| January 1929 | 10:30:17.547| | [R = 0.558655, P = -0.237800, Y = 2.468922] | |
| January 1929 | 10:30:17.738| | [R = 0.817437, P = -0.489588, Y = -1.002781] | |
| January 1929 | 10:30:17.929| | [R = 0.244794, P = 0.644333, Y = -1.520345] | |
| January 1929 | 10:30:18.123| | [R = 1.377840, P = 0.861150, Y = 2.034413] | |
| January 1929 | 10:30:18.314| | [R = 2.001191, P = 0.721268, Y = 1.251072] | |
| January 1929 | 10:30:18.506| | [R = 2.015179, P = 2.155936, Y = 3.042439] | |
| January 1929 | 10:30:18.698| | [R = 1.804481, P = 2.261722, Y = 2.294069] | |
| January 1929 | 10:30:18.890| | [R = 0.811317, P = 2.758304, Y = 2.238116] | |
| January 1929 | 10:30:19.083| | [R = 1.412811, P = 2.989109, Y = 3.819660] | |
| January 1929 | 10:30:19.275| | [R = 1.679462, P = 3.240897, Y = 3.707755] | |
| January 1929 | 10:30:19.466| | [R = -3.584483, P = 4.857412, Y = 4.135270] | |
| January 1929 | 10:30:19.659| | [R = 8.923615, P = 2.065012, Y = -3.396516] | |
| January 1929 | 10:30:19.870| | [R = 4.122156, P = 3.038068, Y = 2.973373] | |
| January 1929 | 10:30:20.062| | [R = -1.862183, P = 3.808295, Y = -2.192655] | |

Table 1

The method 400 moves to block 450 wherein the system projects the accelerometer data on earth coordinates using AccelCData 416 and device orientation 412, as described above, as follows. Block 450 receives the orientation data 412 from block 430. The method 400 at block 450, after the data has been smoothed, calculates the direction (North, East, and Down) of acceleration. These directions are outputted as NorthAcceleration, EastAcceleration, and DownAcceleration.

To get this output, block 450 transforms the acceleration data from the device orientation to the earth orientation using the calculated orientation as a rational matrix. Each acceleration has some impact to the acceleration vector in earth coordination, and the trigonometric functions of each angle of the orientation is a matrix multiplied with the acceleration data along each axis.

The method 400 moves to block 460 wherein, acceleration is integrates with respect to DeltaTime to produce a velocity vector in earth coordinates. In block 460, an initial velocity 422 is acquired. In some embodiments to calculate the initial velocity 422 in earth coordinates, an original velocity vector is established using GPS speed and heading. Using the magnitude of the GPS speed and multiplying by the sine of the heading will produce the East portion of the velocity vector in earth coordinates. Likewise, the product of the cosine of the heading and the magnitude of the GPS speed produces the North portion.

The velocity vector in earth coordinates is outputted as NewNorthVelocity, NewEastVelocity, and NewDownVelocity. Block 460 uses the acceleration vector calculated previous in block 450 (NorthAcceleration, EastAcceleration, and DownAcceleration) and integrates it over delta time from the last accelerometer data to the new accelerometer data to calculate the new velocity vector in terms of North, East, and Down. Given an initial or previous velocity vector (OldNorthVelocity, OldEastVelocity, and OldDownVelocity), the delta vector and the previous or original vector can be added together to determine the new velocity vector. Equations 4.1-4.3 demonstrate this calculation below:

NewNorthVelocity=OldNorthVelocity+
(NorthAcceleration*DeltaTime)

NewEastVelocity=OldEastVelocity+
(EastAcceleration*DeltaTime)

NewDownVelocity=OldDownVelocity+
(DownAcceleration*DeltaTime)　　　Equations 4.1-4.3

The method 400 moves to block 470, wherein velocity is integrates with respect to DeltaTime to produce a change in position in meters. In Block 470 earth oriented velocity vector is integrated over an elapsed time to get a change in earth position. A change in north is added to the previous latitude, a change in east is added to the previous longitude, and a change in down is added to the previous altitude. To calculate a new position in terms of north, east, and down requires the previous position (NorthVelocity, EastVelocity, and DownVelocity) and the integration of the velocity vector over the DeltaTime between the accelerometer data times. Equations 5.1-5.3 generate the change in position in meters below:

DeltaNorthPosition=NorthVelocity*DeltaTime

DelataEastPosition=EastVelocity*DeltaTime

DelatDownPosition=DownVelocity*DeltaTime     Equations 5.1-5.3

Once the delta position (DeltaNorthPosition, DeltaEastPosition, and DeltaDownPosition) is determined in meters along the earth's coordinate system, the change in position in terms of latitude and longitude can be calculated using the earth's radius (EarthRadius) and previous latitude and longitude (OldLatitude and OldLongitude). Equations 5.4-5.5 reflect those calculations below:

NewLatitude=OldLatitude+(DeltaNorthPosition/ EarthRadius)*180/Pi

NewLongitude=OldLongitude+(DeltaEastPosition/ EarthRadius)*180/Pi     Equations 5.4-5.5

Equation 5.6 is the calculation for the new altitude, which is the subtraction of the change in down (DeltaDownPosition) from the old altitude (OldAltitude). Equation 5.6 is shown below:

NewAltitude=OldAltitude−DeltaDownPosition     Equation 5.6

The output of the algorithm at block 470 is the global position 428 for a given point in time. In some embodiments, the method 400 may return back to block 410, wherein new magnetometer data 401 and accelerometer data 402 is received, and the process repeats for the next DeltaTime. In some embodiments, the method 400 after it reaches block 470, goes back to block 450 for new DeltaTime with updating orientation 412 and the corrected accelerometer data 416. The process 400 can be repeated many times, for example, each time a new gyroscope and/or accelerometer data point is recorded. The INS position can be determined by determining the global position 428 repeatedly as a delivery resource moves over time. The repeated global positions 428 can be combined or plotted together to generate a path, route, or map and can be used to determine a current or instantaneous position of the delivery resource, as desired. This location data, map, or path can be used as described elsewhere herein. In some embodiments, the method 400 runs in parallel to GPS location tracking. In some embodiments, GPS location tracking and INS tracking are alternately activated, used, and deactivated in order to reduce device processing demands.

FIG. 4C is a diagram of the orientation axes of a delivery device. There are three orientation axes of a delivery resource, such as a mobile delivery device or vehicle: X 480, Y 490, and Z 495. The pitch 481 of the device is defined by rotation around the X axis 480, which is the axis that runs parallel to the face of the device in the case of an MDD. With the device is a profile orientation with respect to the user, the X axis 480 runs through the device from left to right. Right is the positive axis and left is a negative axis.

Roll 491 is defined as rotation around the Y axis 490 which runs parallel to the face of the device and the positive Y axis runs out of the top of the device while in the profile position.

Azimuth 496 is defined as rotation around the Z axis 495 that is orthogonal to the face of the device where positive azimuth values correspond to the direction out of the face of the device and negative runs out of the back of the device.

The range of rotation minimums and maximums are defined on the device as the following where:
Range of Azimuth 496 is from −Pi to +Pi radians,
Range of Pitch 481 is from −Pi to +Pi radians,
Range of Roll 491 is from −Pi/2 to +Pi/2 radians.
In some embodiments, orientation origins using the magnetometer are as follows where:
Azimuth: pointing the top of the device toward North is 0 and pointing the top of the device to the East is +Pi/2 radians.
Pitch: placing the device so that it is lying flat on a table parallel to the Earth's surface is 0 and placing the device with the top of the device up is −Pi/2 radians.
Roll: placing the device so that it is lying flat on the table parallel to the Earth's surface on the device's back is 0 and placing the device with the right side up is −Pi/2 radians.

Figure 5:
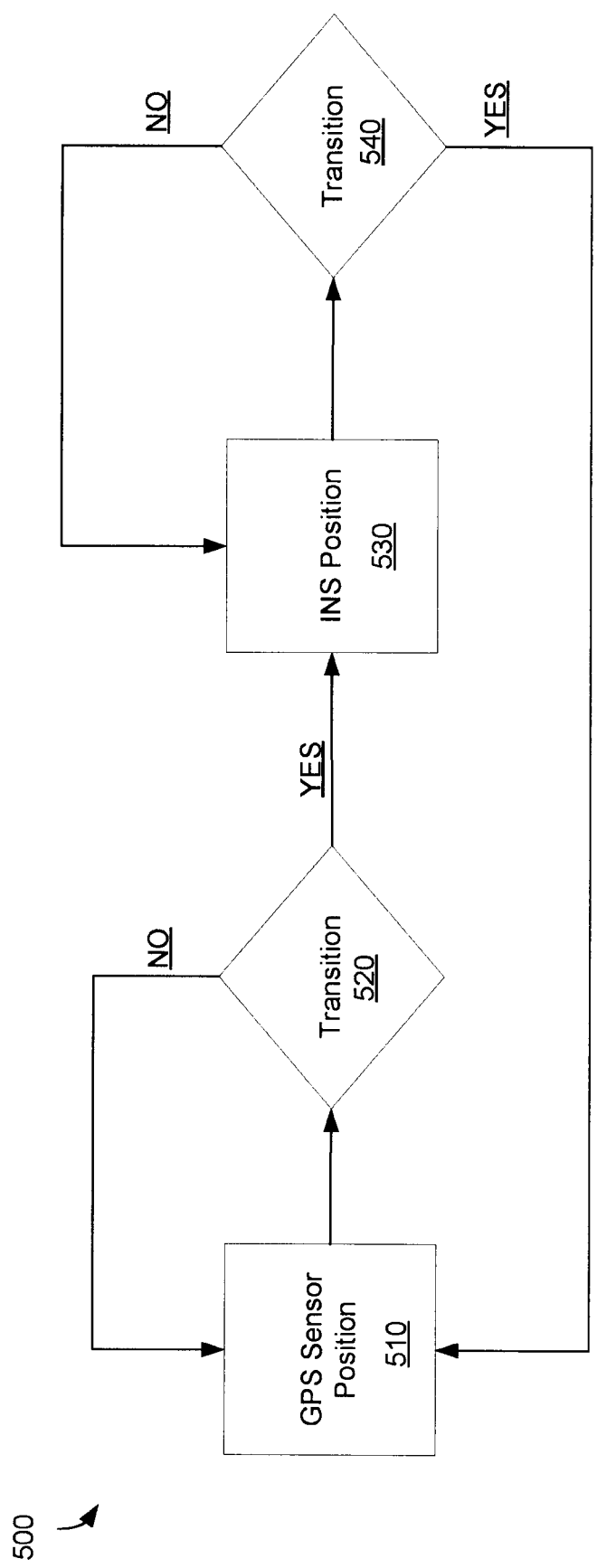
FIG. 5 is a flowchart depicting a process for route analysis tracking transitioning from GPS and INS positioning.

FIG. 5 is a flowchart for an exemplary method 500 for determining transitions from GPS positions to INS positions for a delivery device or resource. The method 500 begins at block 510 when the device or resource has access to accurate GPS signal and positioning. At block 510 the GPS sensor data collected includes:
Position information (e.g. longitude, latitude, altitude)
Timestamp for when data was collected
Number of satellites available for position calculation
Position accuracy in meters While outdoors, regular GPS sensor information can be logged. GPS sensor information may be determined and recorded at any desired periodicity, such as a 10 Hz frequency, and can be transmitted once a second from the MDD to a remote server. In some embodiments, the GPS data may be determined and logged once a second, or any other periodicity. GPS positioning may be sensed more or less than once a second. GPS information may be more accurate when the mobile device is outdoors. There may be several factors to consider when determining if and when GPS position information is accurate. In some examples, GPS position is deemed accurate when the diameter of a cluster of the MDD's calculated position for a given time interval is small, for example, below a threshold number, when the number of satellites meets or exceeds a threshold number, when GPS signal is at a certain strength. Accuracy of the position of the mobile device may be indicated in meters in some examples.

In FIG. 5, GPS position of a mobile device, delivery resource, or other device having GPS capabilities is sensed 510. The method 500 moves to decision state 520 to determine whether a transition from GPS to INS should occur. There are multiple indicators that can be used to determine the transition between GPS position and INS position. For example, the processor 310 may compare GPS position with INS calculations performed as described herein. When the processor 310 determines that the INS calculation detects a position movement that contradicts the GPS information, the processor 310 can determine that a GPS to INS transition should occur. This can occur when both GPS and INS are used in parallel. In some embodiments, GPS and INS can be used in parallel, can overlap in part, or can be used separately. By switching from GPS, INS can be useful in detecting location where GPS is not useable, and when switching to INS, GPS components can be turned off or not used, which can result in savings in battery life and data transmission requirements.

In some embodiments, the delivery resource may be moving up a flight of stairs within a building where GPS signal may be poor or unable to detect movement upwards. Alternatively, a delivery resource may be moving at a lower speed such that GPS satellites may be unable to detect changes in positioning. Switching to INS to better determine the position of the resource may be useful in avoiding lapses in positioning or route data.

In some embodiments, the processor 310 can detect irregularities in the GPS data and, if the irregularities meet or exceed a threshold, such as an accuracy threshold or a time threshold, the processor 310 can determine if the transition should be made. An accuracy threshold may be met when the number of visible satellites is too low, when jitter or variation between consecutive GPS points is too far or if the position moves too rapidly a large distance. A time threshold may be met when GPS has indicators of unreliability or inaccuracy for a threshold time. The threshold time can be of any length. In some embodiments, the threshold time prevents switching from GPS to INS when there is a temporary or transitory GPS interruption. For example, if GPS is unreliable or inaccurate for 1 data point, for 1 second, for 5 seconds, for 10 seconds, then the processor may not determine a transition to INS is necessary. If the GPS is inaccurate or unreliable for a time longer than the time threshold, then the transition to INS may occur.

In one example, GPS may experience drift and may be unable to place the delivery device in an accurate location. In another example, irregular or no GPS sensor information may be logged while the delivery device is indoors or in an area with poor signal. Lack of signal or strength of signal of the GPS can confirm that the device is indoors. In some instances, there might be a GPS signal available through windows or reflected through walls. Even if there is available GPS sensor information, there might be a low number of satellites leading to inaccurate position sensing. If there is available GPS sensor information, there might also be a high diameter in meters for position accuracy. If there is available GPS sensor information, the GPS position sensor data shows erratic movement, for example very small or great differences in position and speed, such as seen with GPS drift.

In some embodiments, the processor can determine, using waypoint information or other information, that a delivery resource is approaching an area or a geofence known to have unavailable or unreliable GPS information. In some embodiments, the GPS may determine that the mobile device is approaching a geofence. The processor can determine when the delivery resource is within a threshold distance of the area or has entered the geofence so that the transition from GPS to INS should occur.

The processor may receive an indicator of poor GPS signal or that the mobile delivery device is approaching a certain area. The processor may compare the indicator to a threshold to indicate whether the position of the mobile device should switch from a GPS system to an inertial navigation system.

Method 500 moves from decision state 520 to block 530 wherein it is determined that a GPS position is no longer accurate. At block 530 the INS position is calculated as described herein.

If a transition from GPS to INS is determined, the method 500 moves to block 530, wherein INS positions are determined as described herein. If a transition from GPS to INS is not detected, the method 500 returns to block 510. With the MDD in INS mode, the path or location of the MDD and items being delivered can continue uninterrupted, and with higher accuracy than using the unreliable or inaccurate GPS signal. The INS position or location data can be sent to a remote server in real-time or can be stored on the device and transmitted and analyzed when the device is returned to the delivery facility after deliveries.

Method 500 moves to decision state 540, wherein it is determined whether to transition from INS to GPS positioning. The criteria for detecting the transition from INS to GPS can be similar to those described above with regard to decision state 520. If a transition is detected, the process 500 moves to block 510, wherein GPS positioning is used. There are different thresholds for number of satellites and accuracy in diameters needed for method 500 to transition from block 540 to block 510. In some embodiments, the accuracy in meters sufficient is from 0 meters to 30 meters. In some embodiments, the accuracy in the number of satellites sufficient to move from block 540 to block 510 is at least 10.

If the transition is not detected, the process moves to block 530, and INS positioning continues.

Accurate tracking regarding delivery times along the route 102 is useful in estimating an accurate delivery time of items. In method 500, being able to switch from GPS signal to track the delivery resource 110 to an inertial navigation system will allow real time live tracking of the exact location of the delivery resource 110 or a carrier associated with the delivery resource 110. Using INS system tracking along with GPS tracking will not only allow more accurate tracking of the delivery resource 110, but also more accurate estimated delivery times. An estimated delivery time will be reflected based on the location of the delivery resource at any given time.

Further, when a delivery resource 110 is given a similar route with similar points and stops, the estimated delivery time can be updated to reflect either the current position given INS and GPS tracking, but also such data collected from the delivery resource 110 having followed that similar route at a previous time.

Figure 6:
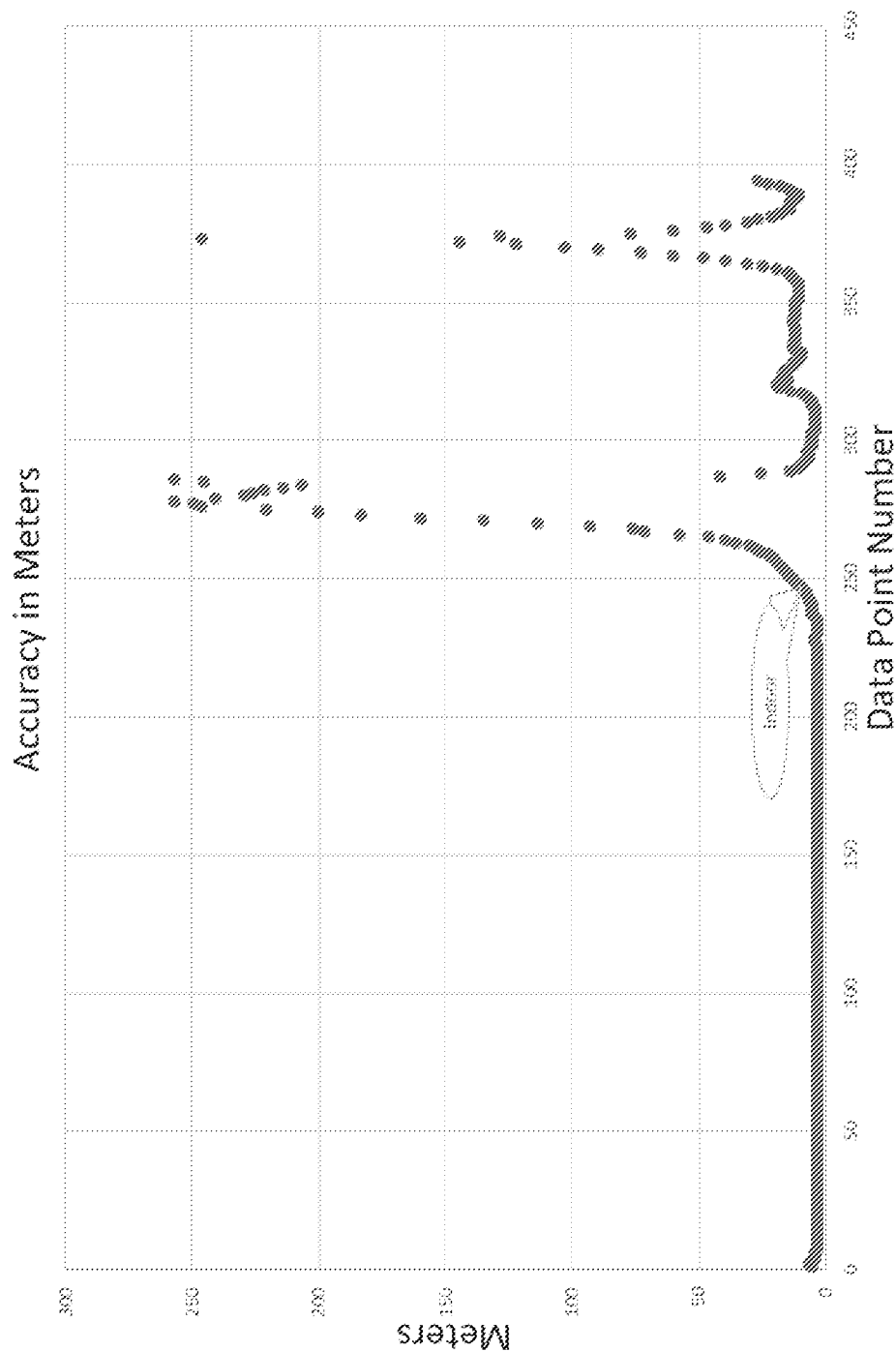
FIG. 6 shows a plot chart of the GPS accuracy in meters when transitioning from outdoors to indoors.

FIG. 6 shows an example of a plot chart of the GPS accuracy in meters when a mobile device or a delivery resource transitions from outdoors to indoors. GPS sensor information indicates that there is a high number of satellites aimable to calculate position. As indicated in the chart, the GPS accuracy decreases significantly beginning near data point 250 as the device being located enters a building. Overall GPS accuracy decreases in the chart as the meters of the positioned device increases, indicating that GPS satellites are experiencing difficulty with locating the device and that the location of the device can only be accurately determined with a larger radius. The shift in accuracy may indicate to the system that a transition from GPS to INS should occur. Near datapoint 290, the meters of accurate positioning decreases, indicating that more GPS satellites are able to more accurately position the device. This increased accuracy indicates to the system that GPS is functioning correctly or more accurately again, and a transition from INS to GPS can occur. The process repeats for datapoints roughly 360-390, where GPS is unreliable or inaccurate. Using the method 500, peaks on the GPS accuracy chart can indicate where transitions from GPS to INS occur.

Figure 7:
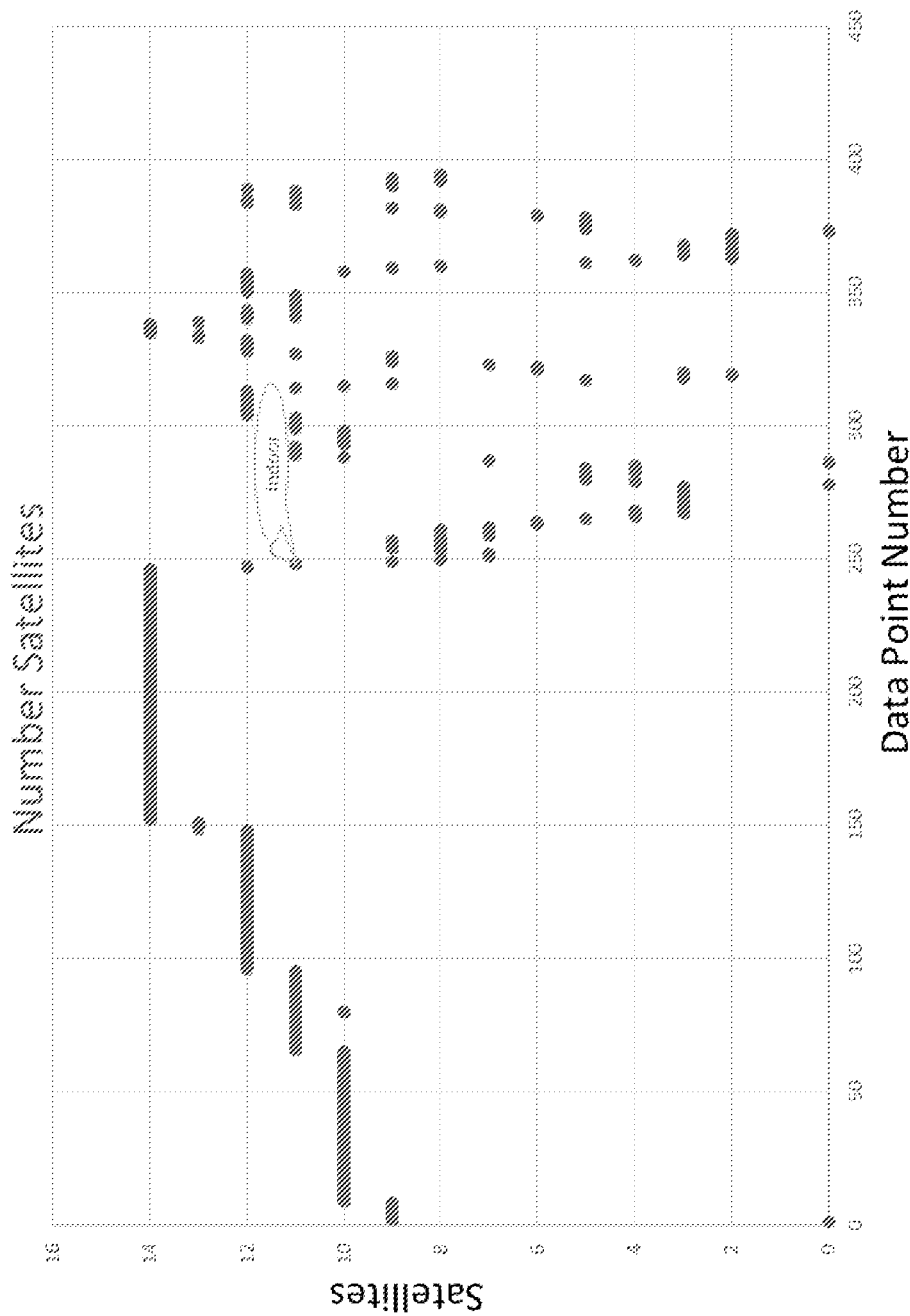
FIG. 7 shows a plot chart of the GPS number of satellites visible to a device transition from outdoor to indoors.

FIG. 7 shows an example of a plot chart of the number of GPS satellites accurately sensing the position of the mobile device as it transitions from outdoor to indoors. The data represented in FIG. 7 is similar to that in FIG. 6, except the number of satellites depicts the accuracy of the signal instead of the distance in accurate positioning. As depicted in FIG. 7, around data point number 250 the number of satellites available is reduced and continues to decrease as the data point number increases. In some areas, the number of satellites able to position the device bounces between higher and lower numbers indicating that the device may have variable connection to satellites. Moving through buildings may cause a device to have accurate GPS positioning in some area and inaccurate positioning in other areas. A system may set a minimum number of satellites required to rely on GPS positioning. If the minimum satellite threshold is not met, the system may switch to an INS system until the number of GPS satellites increases.

Figure 8:
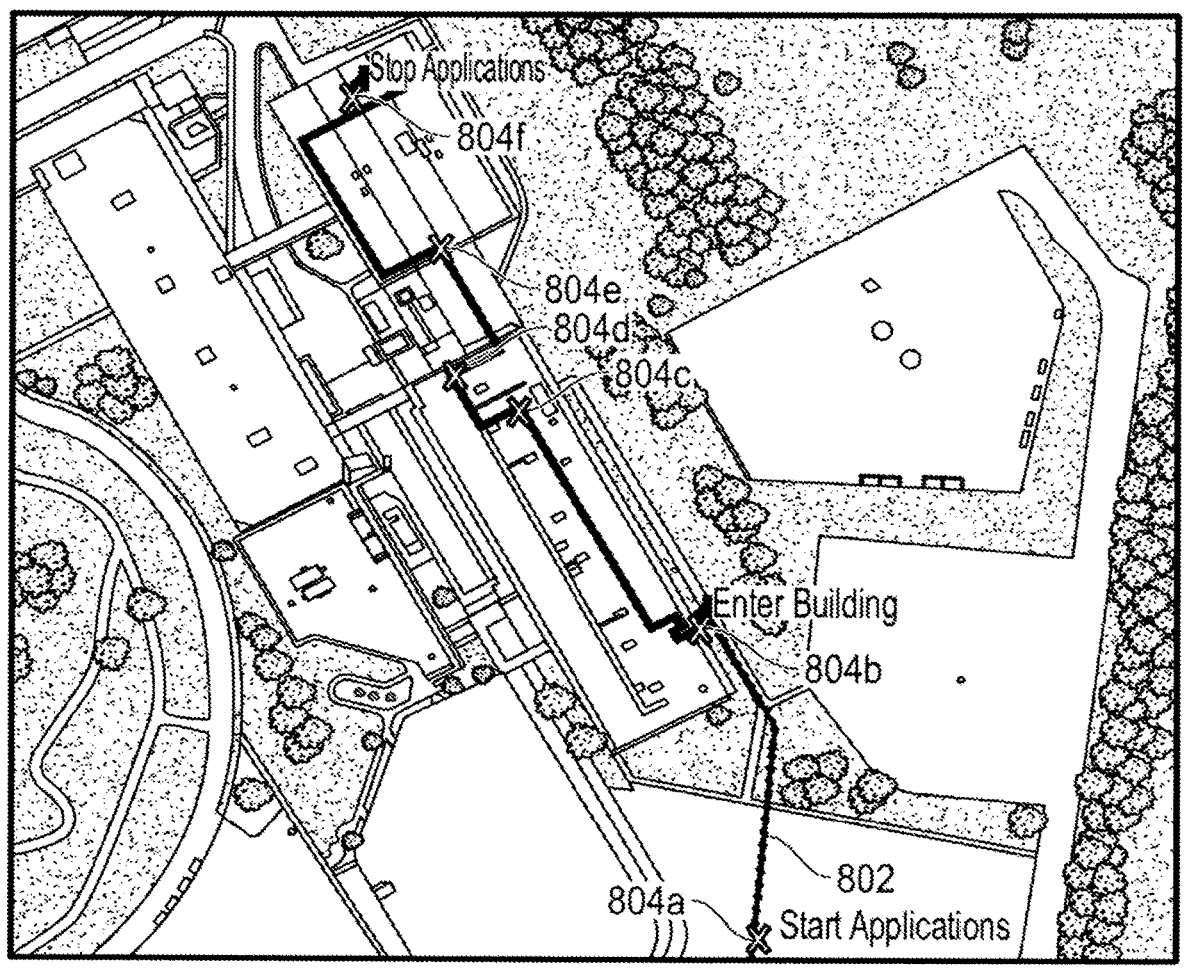
FIG. 8 is a map of an example route of a device using both GPS and INS positioning.

FIG. 8 shows a map of an example route 802 of a device moving from outdoors to indoors, using GPS and INS positioning. The route 802 may comprise any one or more stops 804a-804f, positioned both inside and outside the buildings. Using the systems and methods described herein, the position and movement of a delivery resource can be determined as the delivery resource moves into and through a building. The route 802 starts at point 804a where the device is outside and is receiving a good GPS signal. At point 804b, the device enters the building and GPS signal decreases indicating that a transition may be needed, similar to that depicted in FIGS. 6 and 7. The determination is made to switch to an INS position calculation when the GPS signal is no longer accurate, as described elsewhere herein. The route 802 continues through the building using INS positioning when GPS is unavailable as the delivery device completes stops 804c, 804d, and 804e. As the device exists the building at 804f, another transition from INS to GPS positioning may occur. The log file below is an example of a route tracker log that collects instantaneous accelerations, velocities, and position changes on each INS position.

| Time | Output |
|---|---|
| 12:03:53.263 | AVERAGE GYRO DATA AZIMUTH: 1.3498947015624756 PITCH: 1.5445902664157325 ROLL: 0.931579659656183 |
| 12:03:53.263 | LEARNING ORIENTATION AZIMUTH: 15.071820 PITCH: −6.286630 ROLL: 1.704331 |
| 12:03:53.274 | GPS INS STATE flags GPS_FIX_STATE: RUNNING POS_SOURCE: GPS_SOURCE |
| 12:03:53.274 | GRAVITY CORRECTED ACCEL DATA X: 0.460152 Y: 0.381928 Z: 1.208069 |
| 12:03:53.275 | AVERAGE ACCEL DATA RUNNING ACCEL DT: 0.192000150680542 X: 0.2705938954288272 Y: 0.05555159489040211 Z: −0.07711742290202807 |
| 12:03:53.275 | WORLD ACCELERATION EAST: 0.2757772533631229 is made of 0.26139920512824816: 0.014358195910774144: 1.9852324100613964E−5 |
| 12:03:53.276 | WORLD ACCELERATION NORTH: −0.02661102234379062 is made of −0.07118225810279764: 0.053318089177199275: −0.008746853418192252 |
| 12:03:53.277 | WORLD ACCELERATION DOWN: −0.07470324913425765 is made of 0.007999551796473962: −0.006083031443894011: −0.0766197694868376 |
| 12:03:53.277 | NEW_ACCEL_DATA EAST: 0.275777 NORTH: −0.026611 DOWN: −0.074703 |
| 12:03:53.278 | INS DELTA VELOCITY EAST ACCEL DT: 0.192000150680542 EAST: 0.052949 NORTH: −0.005109 DOWN: −0.014343 |
| 12:03:53.279 | LAST_GPS_FIX Lat: 42.10062467 Lon: −76.2159907 Alt: 248.45526123046875 |
| 12:03:53.279 | LAST_GPS_FIX Heading: 1.2000000476837158 Speed: 0.531407 |
| 12:03:53.280 | INS VELOCITY EAST: 0.138182 NORTH: 0.513127 DOWN: −0.014343 |
| 12:03:53.281 | INS DELTA POSITION EAST: 0.026531 NORTH: 0.098520 DOWN: −0.002754 |
| 12:03:53.281 | LATITUDE CHANGE: 8.850243101415552E−7 |
| 12:03:53.282 | LONGITUDE CHANGE: 3.2121440409666667E−7 |
| 12:03:53.282 | NEW_INS_FIX Lat: 42.100625555024315 Lon: −76.2159903787856 Alt: 248.458015 |
| 12:03:53.283 | NEW_INS_FIX Heading: 15.071820 Speed: 0.531407 AZIMUTH 15.071820 |
| 12:03:53.283 | GPS HEADING IS VALID DISTANCE: 51.29256684824305 meters FIRST GPS (x, y) 8.847678145684768E−11, 9.393374966748524E−11 LAST GPS (x, y) 5.098211298743074, 51.03857027234737 |

The log file above shows the level of detail that is logged and stored using the systems and methods described herein. In some embodiments, the entries logged into the log file as shown above start with an initial position gathered for the device. The initial position is corrected for gravity, and acceleration data is also logged. In some embodiments, as described above, when the GPS signaling is no longer accurate, INS positioning starts to get logged. As seen in the log above, there is a latitude and longitude change that gets logged and gets calculated in the INS position to continue correctly tracking the device without GPS tracking.

Various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and steps described above. Whether such functionality is implemented in hardware or software depends upon the particular application and design constraints imposed on the overall system.

In one or more aspects, the functions described herein may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, e.g., one or more modules of computer program instructions, encoded on a computer storage media for execution by, or to control the operation of, data processing apparatus.

If implemented in software, the functions may be stored on or transmitted over as one or more instructions or code on a computer-readable storage medium. The steps of a method or algorithm disclosed herein may be implemented in a processor-executable software module which may reside on a computer-readable storage medium.

Computer-readable storage media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above can also be included within the scope of computer-readable storage media. Additionally, the operations of a method or algorithm may reside as one or any combination or set of codes and instructions on a machine-readable storage medium and computer-readable storage medium, which may be incorporated into a computer program product.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Instructions refer to computer-implemented steps for processing information in the system. Instructions can be implemented in software, firmware or hardware and include any type of programmed step undertaken by components of the system.

As can be appreciated by one of ordinary skill in the art, each of the modules of the invention may comprise various sub-routines, procedures, definitional statements, and macros. Each of the modules are typically separately compiled and linked into a single executable program. Therefore, the description of each of the modules is used for convenience to describe the functionality of the system. Thus, the processes that are undergone by each of the modules may be arbitrarily redistributed to one of the other modules, combined together in a single module, or made available in a shareable dynamic link library. Further each of the modules could be implemented in hardware. A person of skill in the art will understand that the functions and operations of the electrical, electronic, and computer components described herein can be carried out automatically according to interactions between components without the need for user interaction.

The foregoing description details certain embodiments. It will be appreciated, however, that no matter how detailed the foregoing appears in text, the development may be practiced in many ways. It should be noted that the use of particular terminology when describing certain features or aspects of the development should not be taken to imply that the terminology is being re-defined herein to be restricted to including any specific characteristics of the features or aspects of the development with which that terminology is associated.

While the above detailed description has shown, described, and pointed out novel features of the development as applied to various embodiments, it will be understood that various omissions, substitutions, and changes in the form and details of the device or process illustrated may be made by those skilled in the technology without departing from the intent of the development. The scope of the development is indicated by the appended claims rather than by the foregoing description. All changes which come within the meaning and range of equivalency of the claims are to be embraced within their scope.

What is claimed is:

1. A method of improving accuracy of a mobile delivery device comprising:
    sensing, in a mobile delivery device, a position of a mobile delivery device using a geolocation circuit;
    receiving, in a processor, a first indicator pertaining to accuracy of the geolocation circuit being used by the mobile delivery device traversing a route;
    comparing, by the processor, the first indicator to a first threshold;
    based on a comparison of the first indicator to the first threshold, transitioning to sensing the position of the mobile delivery device with an inertial navigation system;
    updating the position of the mobile delivery device along the route using the sensed position from the inertial navigation system;
    receiving, in the processor, a second indicator pertaining to accuracy of the geolocation circuit about the mobile delivery device;
    comparing, by the processor, the second indicator to a second threshold; and
    based on the comparison of the second indicator to the second threshold, transitioning back to sensing the position of the mobile delivery device by the geolocation circuit.

2. The method of claim 1, wherein the first indicator is geolocation circuit drift of the sensed position of the mobile delivery device.

3. The method of claim 2, wherein the first threshold is the position of the mobile delivery device sensed by the inertial navigation system.

4. The method of claim 1, wherein the first indicator is the position of the mobile delivery device sensed from the geolocation circuit.

5. The method of claim 4, wherein the first threshold is a predetermined distance from a specified point.

6. The method of claim 4, wherein the first threshold is the mobile delivery device entering a geofence.

7. The method of claim 1, wherein the first indicator is signal strength from the geolocation circuit of the mobile delivery device and the first threshold is a minimum signal strength.

8. The method of claim 1, wherein the first indicator is a number of satellites from the geolocation circuit in communication with the mobile delivery device and the first threshold is a minimum number of satellites.

9. The method of claim 1, wherein the second indicator is a number of satellites from the geolocation circuit in communication with the mobile delivery device and the second threshold is a minimum number of satellites.

10. The method of claim 1, wherein the second indicator is the position of the mobile delivery device sensed from the geolocation circuit and the second threshold is a predetermined distance from a specified point sensed from the geolocation circuit.

11. A system for improving accuracy of a mobile delivery device comprising:
    a mobile delivery device traversing a route;
    a geolocation circuit in communication with the mobile delivery device configured to sense a position of the mobile delivery device;
    an inertial navigation system in communication with the mobile delivery device configured to sense a position of the mobile delivery device;
    a processor in communication with the mobile delivery device configured to receive:
        the position of the mobile delivery device sensed from the geolocation circuit;
        a first indicator pertaining to the accuracy of the geolocation circuit on the mobile delivery device;
        the position of the mobile delivery device sensed from the inertial navigation system; and
        a second indicator pertaining to the accuracy pertaining of the geolocation circuit;
    wherein the processor compares the first indicator to a first threshold and the second indicator to a second threshold to sense when to transition between the geolocation circuit and the inertial navigation system.

12. The system of claim 11, wherein the first indicator is geolocation circuit drift of the sensed position of the mobile delivery device.

13. The system of claim 12, wherein the first threshold is the position of the mobile delivery device sensed by the inertial navigation system.

14. The system of claim 11, wherein the first indicator is the position of the mobile delivery device sensed from the geolocation circuit.

15. The system of claim 14, wherein the first threshold is a predetermined distance from a specified point.

16. The system of claim 14, wherein the first threshold is the mobile delivery device entering a geofence.

17. The system of claim 11, wherein the first indicator is signal strength from the geolocation circuit of the mobile delivery device and the first threshold is a minimum signal strength.

18. The system of claim 11, wherein the first indicator is a number of satellites from the geolocation circuit in communication with the mobile delivery device and the first threshold is a minimum number of satellites.

19. The system of claim 11, wherein the second indicator is a number of satellites from the geolocation circuit in communication with the mobile delivery device and the second threshold is a minimum number of satellites.

20. The system of claim 11, wherein the second indicator is the position of the mobile delivery device sensed from the geolocation circuit and the second threshold is a predetermined distance from a specified point sensed from the geolocation circuit.

* * * * *